United States Patent [19]
Brown

[11] 3,818,757
[45] June 25, 1974

[54] DUAL PATH ULTRASONIC FLUID FLOW METERING SYSTEM AND METHOD

[75] Inventor: Alvin E. Brown, Redwood, Calif.

[73] Assignee: Saratoga Systems, Inc., Cupertino, Calif.

[22] Filed: May 5, 1972

[21] Appl. No.: 250,760

[52] U.S. Cl.............................................. 73/194 A
[51] Int. Cl............................................... G01f 1/00
[58] Field of Search.................................. 73/194 A

[56] References Cited
UNITED STATES PATENTS

| 3,237,453 | 3/1966 | Yamamoto et al. | 73/194 A |
| 3,329,017 | 7/1967 | Yamamoto et al. | 73/194 A |
| 3,420,102 | 1/1969 | Brown | 73/194 A |
| 3,440,876 | 4/1969 | Hayes et al. | 73/194 A |
| 3,697,936 | 10/1972 | Zacharias, Jr. et al. | 73/194 A X |
| 3,720,105 | 3/1973 | Cirulis | 73/194 A |

FOREIGN PATENTS OR APPLICATIONS

| 191,155 | 7/1967 | U.S.S.R. | 73/194 A |

Primary Examiner—Charles A. Ruehl
Attorney, Agent, or Firm—Flehr, Hohbach, Test, Albritton & Herbert

[57] ABSTRACT

An ultrasonic fluid flow metering system for use in monitoring volumetric flow of fluids conveyed in conduits or open channels. The flow meter includes at least one pair of transducers which alternately operate as transmitters and receivers to propagate energy through the flowing medium between the transducers. Pulses are applied to the transducers and the transit time of the pulse energy through the fluid in the two directions is utilized to generate frequencies which give an indication of the fluid flow. The system includes means for generating pulses which are transmitted through the fluid in opposite directions and a voltage controlled oscillator, the output of which is divided and used to provide delayed output pulses. The delayed output pulses are compared in time phase to the received pulses transmitted through the fluid in the conduit or channel and the frequency of the oscillator is controlled to provide time coincidence between the compared pulses. A count of the VCO output pulses over a predetermined period is alternately performed for upstream and downstream transmissions and the difference in the count provides a measure of the fluid flow.

17 Claims, 14 Drawing Figures

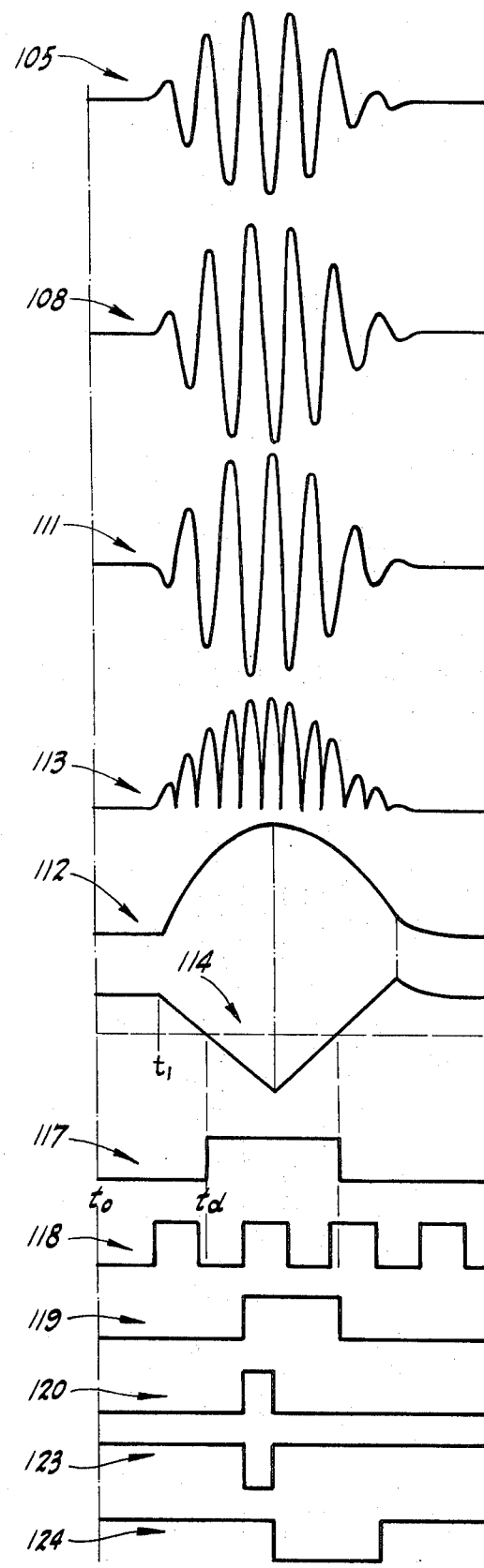
FIG_6a
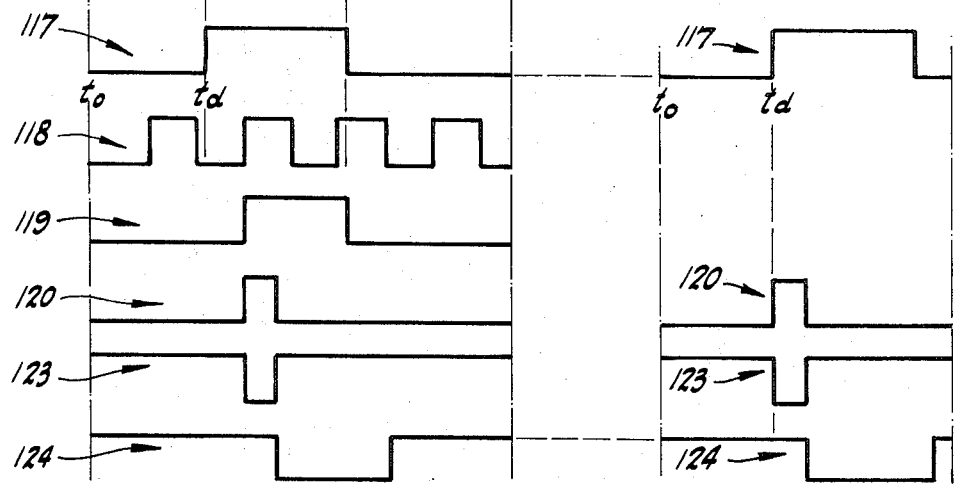
FIG_6b

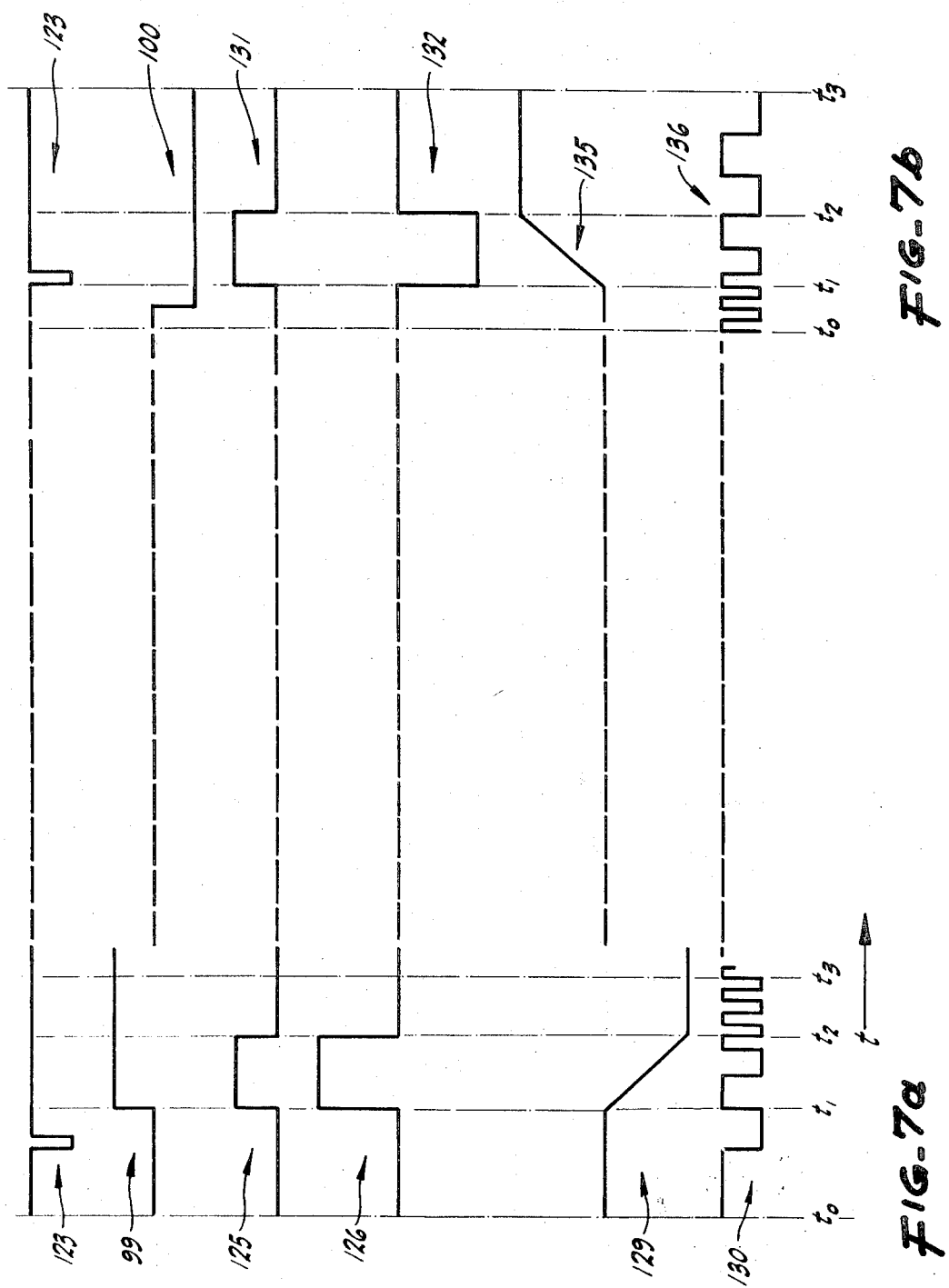

DUAL PATH ULTRASONIC FLUID FLOW METERING SYSTEM AND METHOD

BACKGROUND OF THE INVENTION

The present invention is directed toward a fluid flow metering system and more particularly to a fluid flow metering system for measuring volumetric flow in conduits or open channels utilizing ultrasonic pulses which are transmitted against the direction of flow and then with the direction of flow.

The most widely known method for determining fluid flow rates in a conduit is that utilizing a Venturi meter which operates on a differential pressure principle. There are many variables which affect the accuracy of such a flow metering system including flow turbulence and distortion, and fluid physical properties. A Venturi meter may cause unacceptable head loss due to flow obstruction by the meter itself.

Other flow metering systems have been used such as impeller systems, electro-magnetic systems, and ultrasonic flow measuring systems based on phase, Doppler shift, or transit time principles. These systems all have limitations in the form of attainable accuracy or dependence on fluid parameters which vary with change in ambient conditions or changes introduced directly into the flowing medium itself.

In prior art methods using ultrasonic energy transducers such transducers are mounted in the conduit walls so that they may transmit energy through the flowing medium which is received by other transducers located generally upstream or downstream from the transmitter. Such prior art fluid flow metering systems have utilized the well-known ring-around principle, wherein the fluid medium was the frequency determinative component of the system and receipt of a transmitted signal triggered the following transmitted pulse. This provided an oscillating system with a period equivalent to the time for transmission of the pulse through the medium. The oscillator period differed in length depending upon whether the energy pulse was transmitted in the direction of flow or against the direction of flow. In such a system, generally two pairs of transducers were utilized together with two separate feedback circuits to provide upstream and downstream oscillatory modes. Some such systems operated directly on the resulting upstream and downstream frequencies of oscillation and found flow rate resolution limitations at low flow rates when the two frequencies became substantially the same. Other such systems utilized phase detectors which compared the transmitted and received signal phase relationships integrating the phase detector outputs and presenting the integrated signal to voltage controlled oscillators, thus controlling the upstream and downstream frequencies. This latter type of system was subject to phase instability as might be generated by fluids carrying a considerable concentration of scatterers.

It can be seen that a need exists for a fluid flow metering system which will provide high accuracy of measurement over a wide variety of ambient conditions and flow medium parameter changes.

OBJECTS AND SUMMARY OF THE INVENTION

It is a general object of the present invention to provide an accurate, simple, inexpensive flow measurement system and method.

It is another object of the present invention to provide a fluid flow metering system and method capable of handling a wide variety of flow media and fluid conduit characteristics.

It is another object of the present invention to provide a fluid flow metering system and method which is totally independent of the variable parameters of the flow medium.

Another object of the invention is to provide an improved trigger circuit in a fluid flow metering system.

Another object of the invention is to provide an improved calibration circuit and method in a fluid flow metering system.

Another object of the invention is to provide an improved tracking means which locks the fluid flow metering system in a stable mode of operation.

Another object of the invention is to provide an improved low noise, low level detector for use in a fluid flow metering system.

Another object of the invention is to provide a fluid flow metering system and method where neither differences in transmission path length through the fluid nor variation in angle between the path direction and the nominal flow direction affect the accuracy.

The foregoing and other objects of the invention are achieved by a system in which transducers are mounted relatively upstream and downstream of the direction of fluid flow in communication with the fluid. A voltage controlled oscillator provides a continuous series of output pulses which are sent to a divider and a transmit pulse generator. A count control circuit simultaneously starts the divider and generates the transmit pulse. The divider generates a pulse after a predetermined number of VCO output pulses which creates a delayed pulse and presents it to a time of arrival circuit for time phase comparison with the received and processed pulse. An output signal arises from the time comparison of the two signals and is connected to the VCO. During both upstream and downstream transmission the VCO output frequency is adjusted by the output resulting from the time comparison in such a manner as to drive the delayed pulse into time phase with the received pulse, or to maintain such time coincidence. The VCO output pulses are counted for a predetermined period of time during both upstream and downstream transmission while the delayed and received pulses are held in phase during such periods and a difference in count obtained between upstream and downstream counts indicative of flow. The flow indication is calibrated in specified units by a program controlling the counting period length.

BRIEF DESCRIPTION OF DRAWINGS

FIG. 6A is a timing chain diagram showing the received pulse conditioning timing relations.

FIG. 6B is a timing chain diagram showing the received pulse conditioning for fluids with scatterers.

FIG. 7A is a timing chain diagram showing the signal response for an early actual time of arrival signal.

FIG. 7B is a timing chain diagram showing the signal response of the system for a late actual time of arrival signal.

DETAILED DESCRIPTION OF PREFERRED EMBODIMENT

Figure 1A:
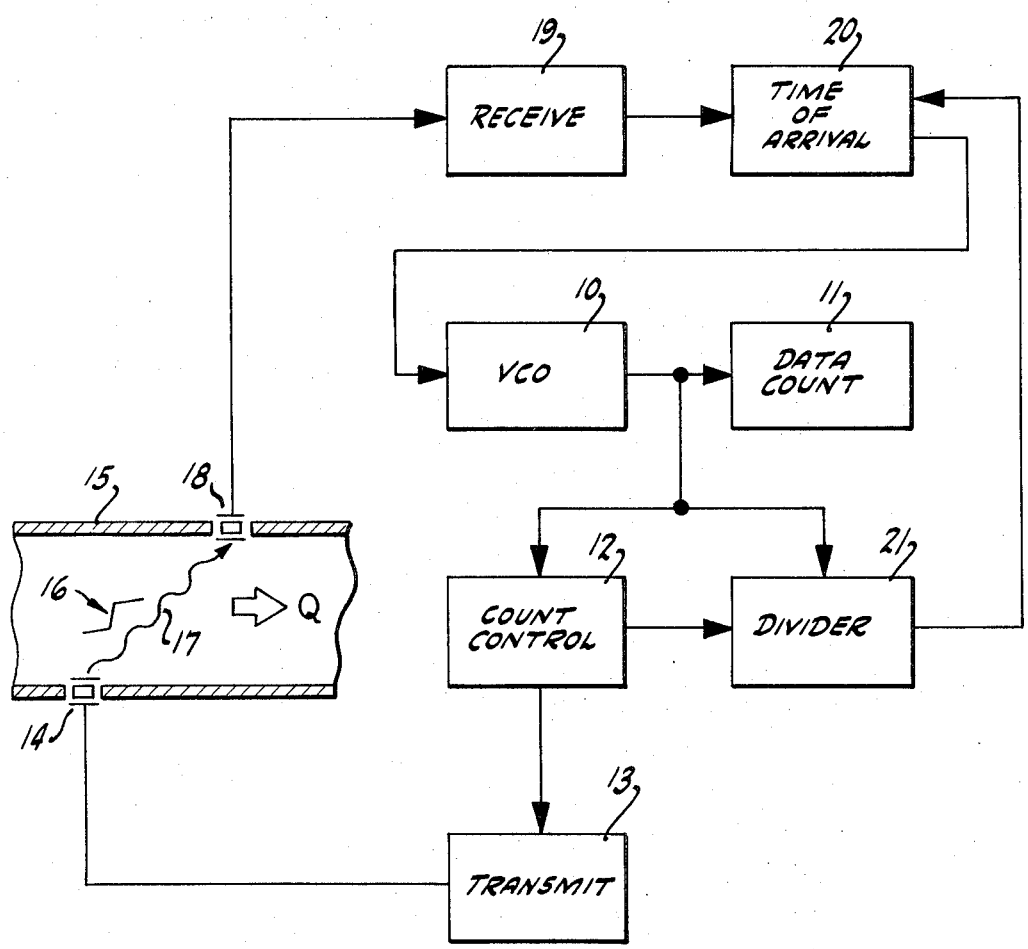
FIG. 1A is a block diagram of the fluid flow metering system.

The invention described here is a fluid flow metering system including a voltage controlled oscillator 10 which provides pulses to a data count circuit 11 which counts the applied pulses for a predetermined time to provide fluid flow information. Referring to FIG. 1A, it can be seen that the output of VCO 10 is operated upon to provide first and second signals which are compared to develop a control voltage for the VCO 10. The first signal is generated when a count control device 12 is operated by a VCO output pulse. The output of count control 12 triggers a transmitter pulse generator 13. A first transducer 14 is mounted in the wall 15 of a fluid conduit or channel and is in communication with the fluid 16. The pulse delivered from the generator 13 is applied to the transducer 14 and the energy 17 imparted to the fluid 16 propagates through the fluid 16 and is received by a second transducer 18 in communication with the fluid 16. The second transducer 18 is situated in the wall 15 of the fluid conduit in a position generally upstream or downstream from the first transducer 14. Thus, the energy 17 propagated through the fluid 16 travels in a direction such that a component of the propagation direction parallels a component of the fluid flow direction. Depending upon the direction of flow, the energy pulse transmitted through the fluid will be aided or opposed whereby transit times upstream and downstream will be different. The received energy is connected to a receiver circuit 19. The received pulse is delivered to time of arrival circuit 20 as the first signal.

The second signal is generated by dividing the VCO pulses received after the first pulse is generated. A divider means 21 generates the second signal a given number of VCO pulses after the transmitted pulse which gives a predetermined delay. It can be seen that the delay time is a function of the output frequency of VCO 10; a higher frequency providing a shorter delay and conversely a lower frequency providing a longer delay. The delayed pulse is delivered to the time of arrival circuit 20 as the second signal which also receives the actual received pulse as the first signal. This latter circuit 20 provides time phase comparison between the actual received pulse and the delayed pulse and a resulting uniform error charge is dispensed to the input of the VCO 10 to change the output frequency of VCO 10 causing the output initiated by divider 21 to coincide in time with the actual received pulse. The foregoing generation and comparison of first and second signals and uniform error charge continues maintaining the delayed pulse in time coincidence with the processed received pulse. VCO output pulses are counted for a predetermined period of time while the delayed and received pulses are maintained in coincidence and stored for comparison with the pulse count obtained when energy is transmitted in the opposite direction through the fluid. The time during which counts are collected and recorded in any specific system varies from a fraction of a second to several seconds depending upon the physical characteristics of the fluid conduit and the parameters of the fluid itself.

The first and second transducers 14 and 18 are of identical construction and may be of the type as described in U.S. Pat. No. 3,420,102. Through the use of proper switching means they may be used first as transmitter and receiver respectively and then as receiver and transmitter respectively. The switching means are arranged to provide first for energy to be propagated against the direction of flow and then for energy to be propagated in the direction of flow. It can be seen that the frequency maintained during transmission upstream will differ from that maintained during transmission downstream due to the difference in transmit times. The difference in output frequencies is a measure of the fluid velocity. The data count circuit 11 looks at the difference in the number of VCO pulses recorded for a predetermined time for the two directions of transmission and reduces the difference count to an indication of fluid flow rate.

Figure 1B:
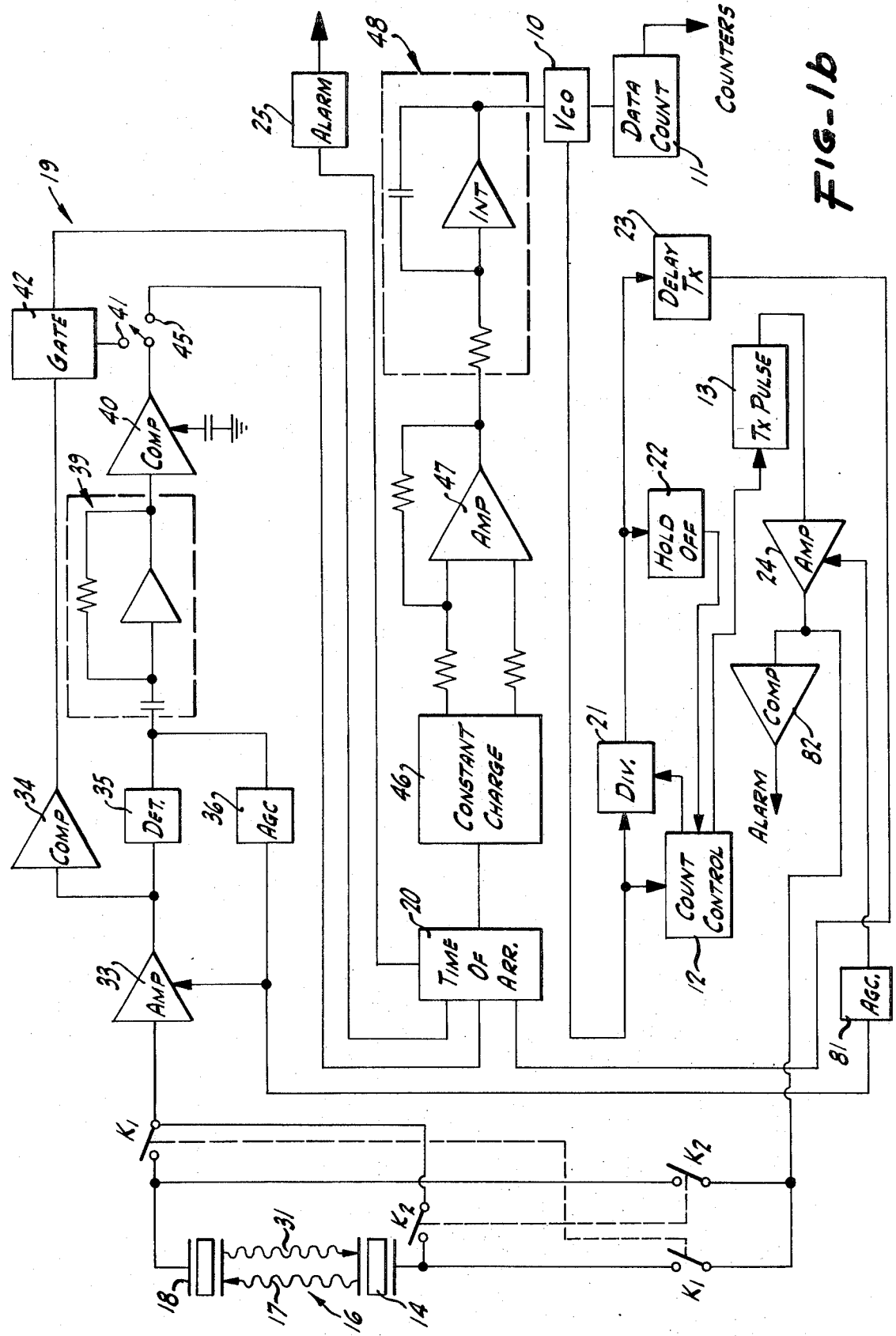
FIG. 1B is a block diagram of the transmitted/-received signal routing and conditioning.

Referring now to FIG. 1B, the major components of the system are broken down in more detail and the interrelation between transducer switching, processed-received pulse, delayed pulse, pulse comparison and VCO control is shown. For example VCO 10 has an output frequency range of 1–3 megacycles for a 4 inch diameter pipe. For larger diameter pipes the VCO output frequency range would be correspondingly lower and conversely for smaller diameters the range would be higher. The output from the oscillator 10 is delivered to the divider 21 and count control device 12. Digital outputs of opposite state from the count control device 12 are connected to the divider 21 and to the transmit pulse generator 13. The output from the divider 21 is connected to a hold-off pulse generator 22 which provides a hold-off or disabling function for the dwell time of the pulse. The output from the hold-off pulse generator 22 is fed back to count control device 12. The output from divider 21 is also connected to a time delay pulse generator 23. The delayed output from pulse generator 23 is applied to time of arrival circuit 20 which may include a dual data type edge triggered flip-flop device. The time of arrival circuit 20 provides an input signal to failsafe alarm circuit 25.

The output from pulse generator 13 is amplified by transmitter amplifier 24 and is then directed through either switches K1 or K2. When switching means K1 are closed, switching means K2 are open. With K1 closed, the transmit pulse is delivered to the first transducer 14 which transmits an energy pulse 17 through the flowing medium 16. The second transducer 18 in communication with the medium 16 receives the pulse 17 and delivers it through the other closed contact of K1 to the receiver amplifier 33. The output of amplifier 33 is applied to cross-over voltage comparator 34 and a low level detector 35 which also provides an output pulse. The output of detector 35 is connected to an automatic gain control integrator 36. The output from integrator 36 is in turn applied to the gain control of the receiver amplifier 33. The output from low level detector 35 is also applied to a differentiator 39 which in turn provides an input for a received pulse voltage comparator 40.

In one circuit configuration, switch means connects the output of the received pulse comparator 40 to the reset terminal 41 of a received signal gate 42. The received signal gate 42 may be a dual data-type edge triggered flip-flop device. The output from the comparator 34 is connected to the trigger input of the gate 42. The output from the gate 42 is applied to the time of arrival circuit 20 for time comparison with the delayed pulse initiated by the divider 21.

An alternate representation of the received pulse described above is connected through switching means to terminal 45. In this manner, the output from the received pulse comparator 40 is connected directly to the time of arrival circuit 20 for comparison with the delayed pulse initiated by divider 21.

The time of arrival circuit 20 compares the time of arrival of the processed-received and delayed pulses and directs the output of constant charge dispenser 46 to the inverting input of a constant charge amplifier 47 if the processed-received pulse is late and into the non-inverting input of the amplifier 47 if the processed-received pulse is early. The output of the constant charge amplifier 47 is connected to the input of an integrator 48. The output of the integrator 48 is driven one way or the other depending on the polarity of the pulses from the constant charge amplifier 47 and, in turn, is connected to the input of VCO 10 to control the output frequency and consequently the delay imposed by divider 21. The output of the VCO 10 is also applied to the data count circuit 11 as previously described.

Figure 2:
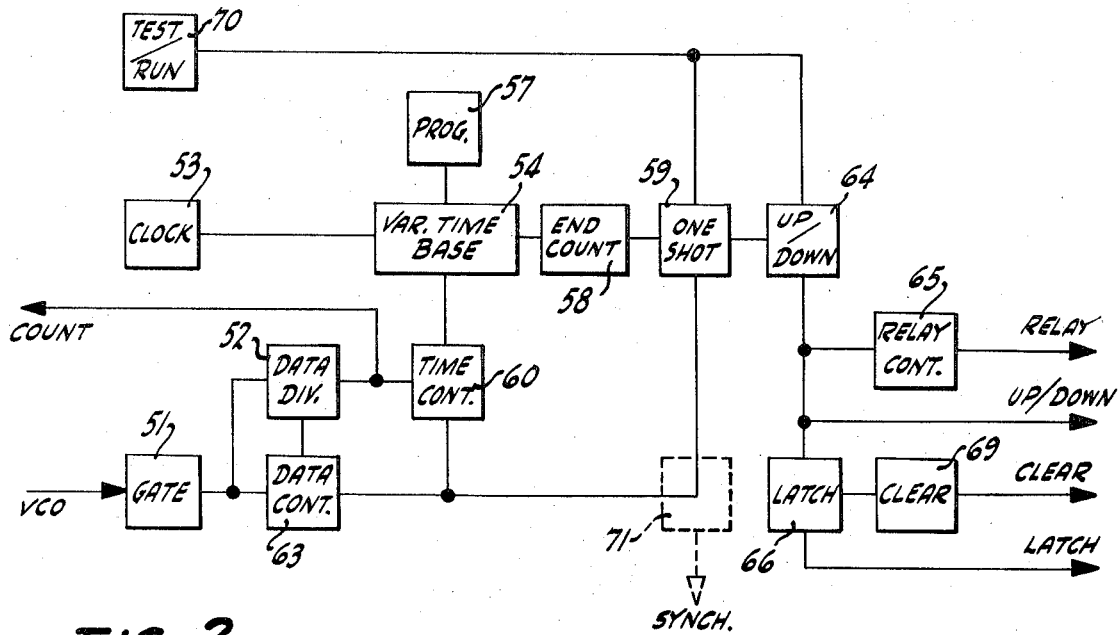
FIG. 2 is a block diagram of the data count control section of the system.
Figure 3:
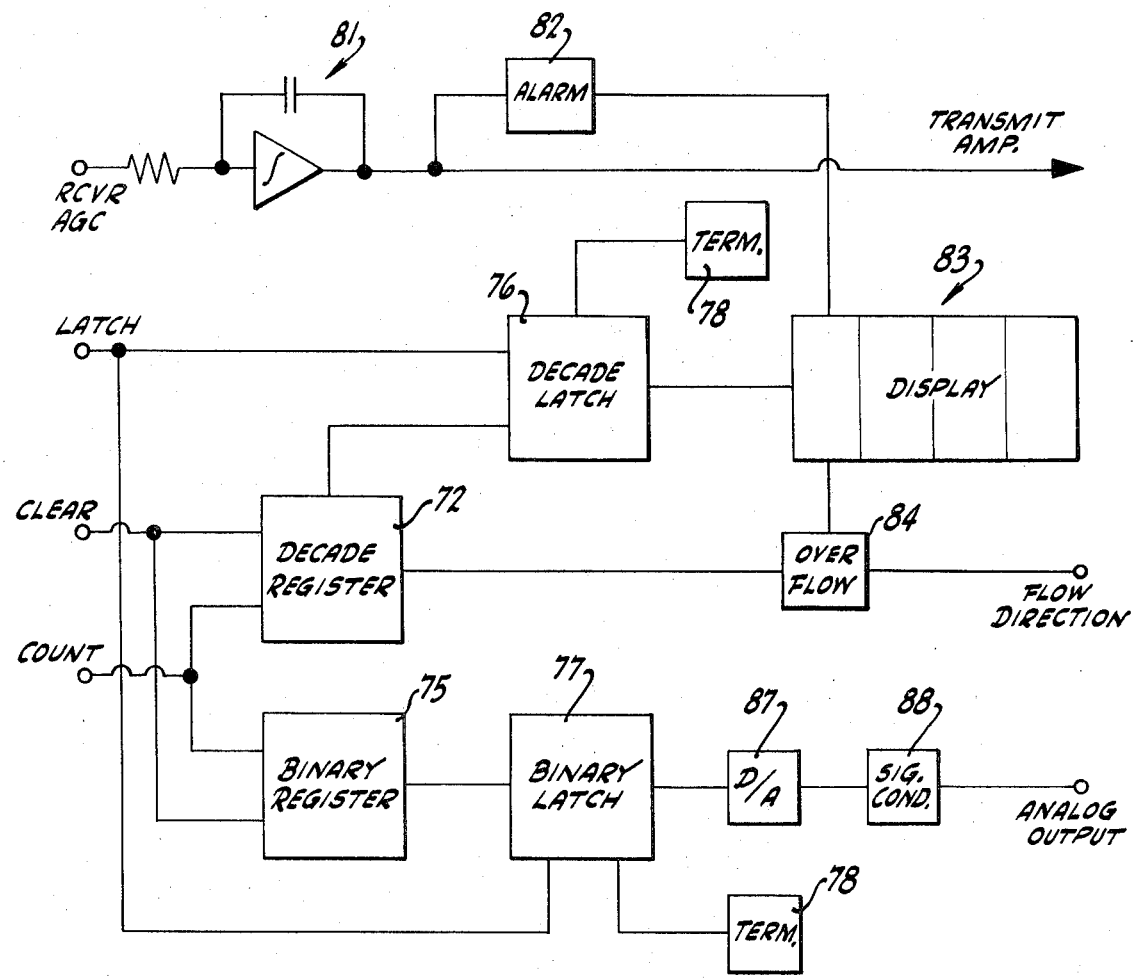
FIG. 3 is a block diagram of the data count reduction section of the system.

The data count circuit 11 is shown in detail in FIGS. 2 and 3. The circuit 11 receives, calibrates, and counts output pulses from VCO 10 when the delayed pulse and the received pulse have been locked in time phase. It also conditions and displays the count in final meaningful form and provides an additional malfunction alarm indication and a direction of flow indication. VCO 10 has its output connected to a gate 51 which is connected to a data count divider 52. A clock circuit 53 is connected to a variable time base counter 54, which in this embodiment has a count capability of 10 million. The time base 54 is rendered variable by a program 57 which initially fills up the time base 54 with a predetermined count. The output from the variable time base 54 is connected to an end-of-count detector 58 which, in turn, is connected to an end-of-count pulse generator 59. Pulse generator 59 directs its pulse to a variable time base control 60 to disable the variable time base 54. The pulse generator 59 is also connected to a data count divider control 63 to simultaneously disable the data count divider 52. The data count divider 52 is, in turn, connected to the variable time base control 60 to enable the variable time base counter 54 at the end of the pulse from the pulse generator 59.

Another output from the pulse generator 59 is directed toward the up/down count control 64. The output from the up/down count control 64 is directed to a relay control 65 which determines the closing and opening of control switches K1 and K2 seen in FIG. 1b. The output from the up/down count control 64 is also directed to a counter latch pulse generator 66. A counter clear pulse generator 69 is connected to one of the outputs from the counter latch pulse generator 66 and is triggered on the trailing edge of the counter latch pulse. A test/run select switching circuit 70 is connected to the end-of-count pulse generator 59 and the up/down count control 64 to reset them to their initial states when going from the test mode to the run mode. An optional printer synchronizing device 71 is provided when required.

Turning now to FIG. 3 there is seen a block diagram showing the major components included in the data count reduction section of the data count circuit 11. Here the counts up and the counts down are received and a count difference is provided. Flow direction indication in the conduit is provided as is an alarm actuated by maximum gain at the transmitter amplifier 24 indicating abnormally low received signal strength. Decade counting register 72 is provided with a 10,000 count capability in this embodiment. Binary counting register 75 with a 12 bit counting capacity in this embodiment is also provided. Pulses from the output of the data count divider 52 are delivered to both decade register 72 and binary register 75. A decade latch function 76 and a binary latch function 77 are provided for their respective counting registers 72 and 75. The output from the counter latch pulse generator 66 is connected to both latching circuits 76 and 77. Terminals 78 are also connected to both latching circuits 76 and 77 to provide general access points to system output signals.

The output from the receiver automatic gain control integrator 36 is delivered to the input of the transmitter automatic gain control integrator 81. The output of the transmitter AGC integrator 81 is connected to the gain control input of the transmitted pulse amplifier 24 and is also connected to a low signal alarm voltage comparator 82 which is in turn connected to a visual readout display 83. In this embodiment the low signal alarm indication appears as a letter "A" in the left hand indicator of display 83 when the received signal strength is so low that the transmitter amplifier 24 is peaked at its highest gain.

Overflow indicating device 84 is connected to the decade counting register 72. The overflow indicator 84 is actuated when the count down exceeds the count up, which indicates a reverse flow. The overflow indicator 84 is connected to the visual readout display 83. In this embodiment a numeral 1 appears in the left hand indicator of display 83 when the flow in the conduit is in reverse to that assigned as normal downstream flow.

The binary latch function 77 is connected to a digital to analog converter 87. The analog output from the convertor 87 is connected to a signal conditioning circuit 88 which provides the desired form and level of output.

It may be seen that when relay control 65 in FIG. 2 directs contacts K2 to close and K1 to open in FIG. 1B that second transducer 18 now performs as the transmitter directing an energy pulse 31 as indicated through the flowing medium 16 to be received by the first transducer 14. The circuit configurations described thus far perform the same functions without regard to whether first and second transducers 14 and 18 are operating at any given moment as transmitters or receivers.

Figure 5:
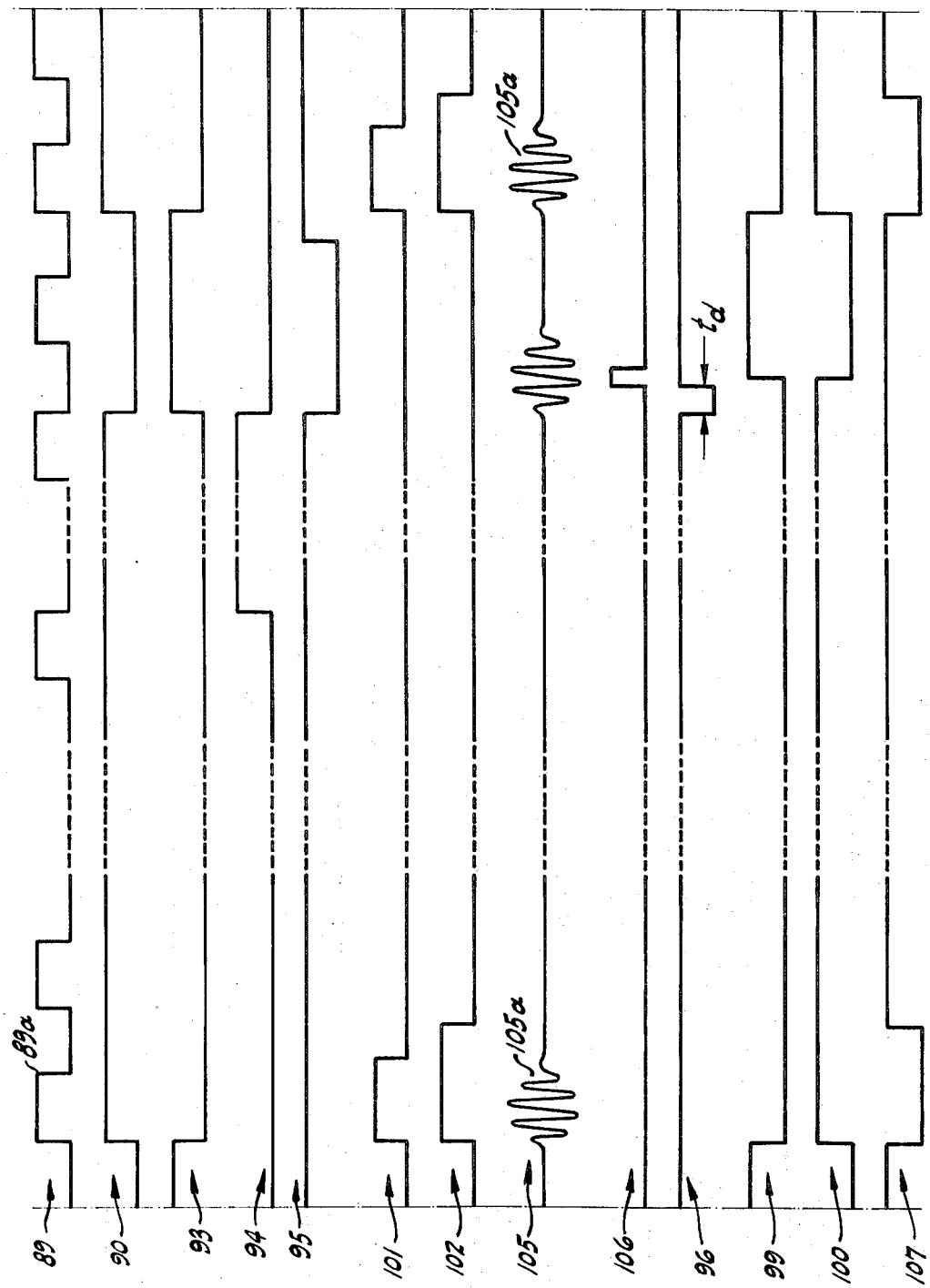
FIG. 5 is a timing chain diagram showing the divider and count control signal time relations.

Turning now to the operation of the system just described the generation of the delay imposed by divider 21 and associated circuitry will now be discussed. The purpose is to provide a means for controlling the output frequency of VCO 10. The output 89 of the VCO 10 is seen in FIG. 5. In this embodiment a leading edge on the VCO output pulse 89a changes first and second digital output states 90 and 93 at the count control device 13. The fall in the second output state 93 enables the divider 21 and a count of 256 VCO output pulses 89 is initiated on the trailing edge of the VCO pulse 89a which caused the changes in state 90 and 93. The 256 VCO pulse count represents a delay in time of 256 VCO output 89 periods. The divider 21 presents an output 94 which rises at a count of 128 and falls at a count of 256. The fall in the divider output 94 triggers output 95 from the hold-off pulse generator 22. The hold-off pulse 95 is delivered to count control 13 and resets the first and second count control output states 90 and 93. Pulse 95 also disables count control 13 for its dwell time so that output states 90 and 93 cannot be changed again until it has ended. The resetting of the first count control output state 90 triggers the delay pulse generator 23 producing output 96. The end of pulse 96 triggers a change in state at the two outputs 99 and 100 from the edge triggered device A5 in the time of arrival circuit 20. The dwell time of pulse 96 thus effects a fixed delay time for outputs 99 and 100 which is in addition to the 256 periods of VCO output 89. Pulses 99 and 100 represent the delayed pulse utilized in the time of arrival determination. The rise in the first count control output state 90 also triggers the transmitter pulse generator 13 to provide the transmitter pulse 101. This same rise in the first count control output 90 also triggers a one shot device A15 in FIG. 8 which generates a receiver guard pulse 102 blocking the processed-received pulse 106 short of the time of arrival circuit 20 at device A14 in FIG. 8. The received pulse 105 displays spurious or noise signals 105a due to energy propagation through structural members or undesired electrical excitation resulting from transmitted pulse 101. This blocking is accomplished for the purpose of preventing presentation of spurious inputs 105a to the time of arrival circuit 20 while data is being taken. The processed-received pulse 106 is allowed to pass when the pulse 102 is not present at A14 and is subsequently delivered to the time of arrival circuit 20 in a manner to be presently described. The leading edge of the first count control output pulse 90 also causes a reset pulse 107 which is delivered to the time of arrival circuit 20 to reset the edge triggered time of arrival outputs or delayed pulses 99 and 100 to their normal states.

Figure 9:
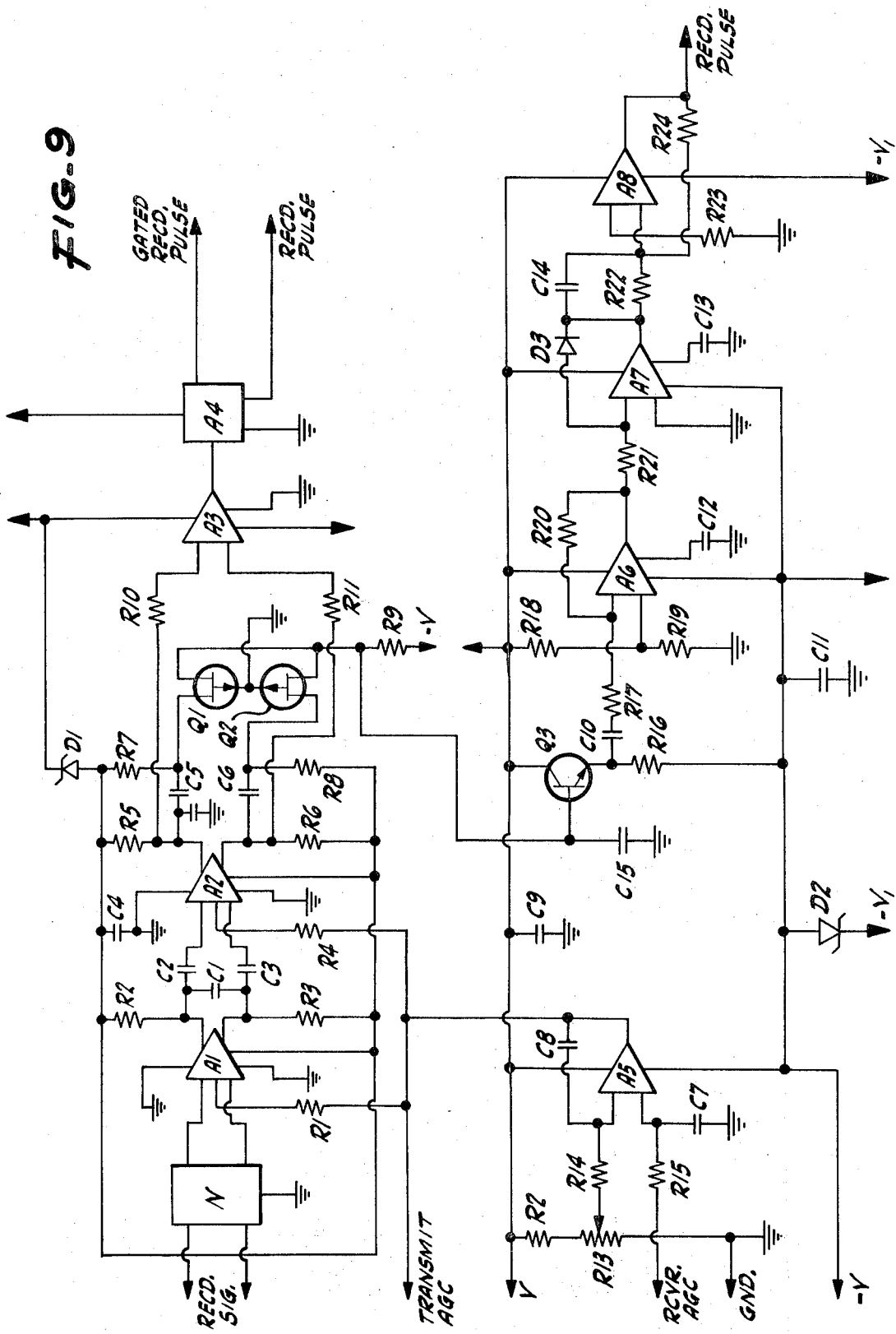
FIG. 9 is a schematic circuit showing the received signal processing section of the system.

Continuing the description of the preferred embodiment reference is now made to FIGS. 6a and 9 which show the timing chain for the received pulse conditioning circuit and a schematic for that section of the system circuitry respectively. A processed-received pulse 120 is generated and is compared in time phase with the delayed pulses 99 and 100 and the comparison initiates means to control output frequency of VCO 10.

The received pulse 105 is connected to the receiver amplifier 33. The amplifier 33 operates in push-pull and provides a non-inverted output 108 and an inverted output 111. The outputs 108 and 111 are presented to the low level full wave detector 35 which produces the smoothed and rectified output 112 in the following fashion. The inverted output 111 is connected through capacitor C5 to the drain of the P channel junction FET Q1 as seen in FIG. 9. The gate of Q1 is at ground potential placing Q1 in a conducting condition for positive voltages applied to the drain. The first positive going pulse in the inverted output 111 is seen to be the second pulse in sequence in the unsmoothed rectified received pulse 113. The source of Q1 is brought to the base of an emitter follower Q3 as seen in FIG. 9. The non-inverted received energy pulse 108 is coupled through capacitor C6 to the drain of the P channel junction FET Q2. The gate of Q2 is also brought to ground potential and the source is tied to the source of Q1 and therefore to the base of the emitter follower Q3. Since Q2 is also placed in a condition to conduct positive going pulses appearing at the drain the first pulse in the non-inverted received pulse 108 can be seen to be the first pulse in sequence in the unsmoothed rectified received pulse 113. A smoothing capacitor C15 is placed in the base circuit of the emitter follower Q3 to provide the output 112 from the low level full wave detector 35.

The detector output 112 is delivered to the differentiator 39. The maximum slew rate of the differentiator 39 is carefully adjusted so as to be less than the rate of change of curvature of the detector output 112 until at least two points of inflection in the detector output 112 have occurred. Under these circumstances the differentiator 39 produces the output 114. The voltage comparator 40 is set to produce an output 117 which occurs at the point marked $t_d$ in FIG. 6. This imposes a time delay from the first sound point marked $t_1$ to the beginning of output 117, $t_d$. Both the time delay from the first sound point and the dwell time of the output 117 can be seen to be functions of the maximum slew rate of the differentiator 39 and the voltage setting at the comparator 40. The detector 35, differentiator 39 and received pulse comparator 40 comprise the major components in the improved trigger circuit.

In the case of a flowing medium which is comparatively clean, not containing too many energy pulse scatterers, the comparator output 117 is directed through a switching means to terminal 41 at the received signal gate 42 in FIG. 1b. The cross-over comparator 34 produces an output 118 which is a series of square pulses of the same frequency as the received pulse 105. The gate 42 is an edge triggered device and having been enabled by the pulse 117 will produce a gate output 119 upon arrival of the first leading edge in the cross-over comparator output 118 to arrive after the leading edge of the time delayed output 117. The gated pulse 119 is connected to the time of arrival circuit 20.

Figure 8:
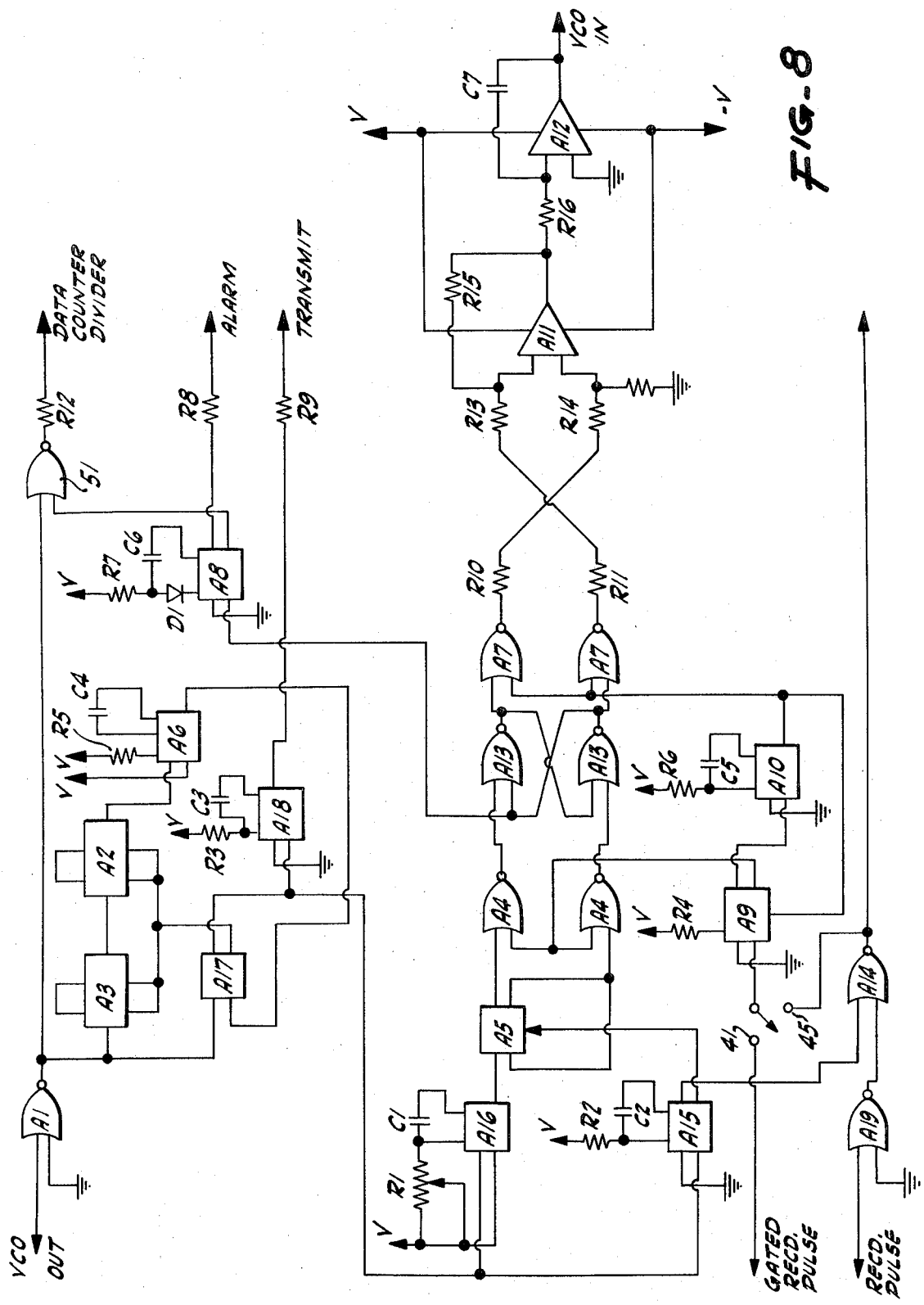
FIG. 8 is a schematic circuit showing the signal tracking control section of the system.

The gated pulse 119 is connected to the input of the pulse shaper A9 as seen in FIG. 8 which is a one shot device. A positive going pulse 120 and a negative going pulse 123 are initiated by the arrival of the gated pulse 119. The positive pulse from the pulse shaper A9 is connected to the constant charge dispenser A10 creating a negative going pulse 124 at its output. The charge dispenser pulse 124 is directed along one path to the pulse shaper device A9 to terminate the positive and negative going pulses 120 and 123. The pulse 123 thus acquires a pulse width equivalent to the transit time of the pulse 120 through the charge dispenser A10 and back to the pulse shaper A9. The pulse 123 then represents the received pulse with the time delay imposed in the output 117 from the comparator 40 and depicts the actual time of arrival plus delay of the processed received pulse 106.

In the event the flowing medium contains a sufficient proportion of scatterers to diffuse the energy being propagated through the fluid the received signal will be relatively weak and contain considerable phase noise. Under such conditions the delayed comparator output 117 is connected directly to the time of arrival circuit 20 through switching means to terminal 45 and directly initiates the pulse shaper positive and negative going pulses 120 and 123 as seen in FIG. 6b. The remainder of the signal processing does not change. It is evident that this latter alternative provides a stable synthesized and delayed received signal which is not subject to the errors which would be introduced by excess phase noise in the cross-over comparator output 118.

The time of arrival circuit 20 contains an edge triggered device A5 in FIG. 8 which generates outputs 99 and 100 as heretofore described. Referring now to FIGS. 7a and 7b the details of the function of the time of arrival circuit will now be described. The negative going pulse 123 from the pulse shaper A9 in FIG. 8 is seen in the timing chain depicted in FIG. 7a to be early in time compared with the edge triggered time of arrival output 99. Referring to FIG. 8 at the point in time when the signal 123 arrives at the pair of nor gates A4 the upper gate of the pair is in a condition to conduct with both gate inputs at a zero state. The lower nor gate of the pair A4 is blocked by a 1 state on one of its input terminals. Thus the early pulse causes a 1 state to appear at the output of upper gate A4 and the input of the upper nor gate of the pair A13. Lower nor gate of the pair A4 has a zero output state connected to the input of lower gate A13. A zero state at the output of upper gate A13 attached to the lower A13 input provides a 1 state at lower gate A13 output. This in turn is taken to upper gate A13 input which together with the zero input from upper gate A4 produces a zero output to upper gate A7. The early pulse thus causes the constant charge pulse 124, also at a zero state, to appear at the output of upper nor gate A7 as the pulse 125 which is delivered to the non inverting input of the amplifier 47. The non-inverted amplified pulse 126 is connected to the input of the integrator 48 which in turn causes the integrator output voltage 129 to fall. The particular voltage controlled oscillator 10 used in this embodiment has a frequency relationship which is inverse to the input voltage. Thus, a fall in the input voltage to the voltage controlled oscillator 10 will cause a rise in the frequency output 130 which will shorten the time period required to count 256 pulses thus shortening the total delay time imposed on pulse 99 bringing it into time coincidence with the received pulse 123.

Conversely as seen in FIG. 7b if the received pulse 123 is later in time than the outputs 99 and 100 from the edge triggered time of arrival device A5 the lower nor gate of the pair A4 in FIG. 8 is in an enabled condition with zero state at both inputs and conducts. This in a manner similar to that described above places both of the input terminals of the lower nor gate in the A7 pair in FIG. 8 at a zero state conducting the constant charge 131 to the inverting input of the amplifier 47. The inverted and amplified constant charge 132 is then delivered to the integrator 48 causing the integrator output 135 to rise. The integrator output 135 rise supplied as an input to the voltage controlled oscillator 10 causes the oscillator output 136 frequency to fall thus bringing the leading edge of the output 100 from the time of arrival circuit 20 into time coincidence with the output 123 from the pulse shaper A9.

A point in the circuit at the input to the upper nor gate of the pair A13 of FIG. 8 is seen to change state each time the shaped pulse 123 goes from early to late or late to early. This change of state is connected to the input of a retriggerable one-shot device A8 in FIG. 8 which inhibits an alarm 25 as seen in FIG. 1. The dwell time of the output pulse is determined by the values of components R7 and C11 in FIG. 8. As long as changes in early-late state occur at periods of time less than the dwell time of the output pulse the device A8 is retriggered and the alarm output is held in the triggered or up condition. This provides a fail-safe alarm feature. The low state output from device A8 is connected to a nor gate 51 in FIG. 2 which enables it to pass voltage controlled oscillator output pulses 89 to the data count divider 52.

The output 117 from the comparator 40, which includes the predetermined time delay matching the delay imposed by pulse 96 into the delayed pulses 99 and 100 may be connected to the input of the receiver automatic gain control integrator 36. In this embodiment, however, the output 112 from the detector 35 is connected to the input of the receiver AGC integrator 36. The results are substantially the same. The integrator 36 has an input bias which causes the integrator output voltage to drift to a value to produce high gain in the receiver amplifier 33. The detector output pulses 112 will therefore have an initial high amplitude and upon integration by the integrator 36 will produce an integrator output which will turn the receiver amplifier gain down until the bias and detector pulses 112 balance the output from the integrator 36 at a stable point. It can be seen that the steady state gain of the receiver amplifier 33 is determined by the bias voltage setting to the integrator 36. The purpose for the receiver AGC is to keep the receiver amplifier 33 from triggering on noise when the gain is too high or from dropping to a gain so low that the low level detector output 112 is below the maximum slew rate of the differentiator 39.

The output from the receiver AGC integrator 36 is also delivered to an automatic gain control integrator 81 for the transmitter amplifier 24. The transmitter AGC integrator 81 has a response time much slower than the receiver AGC integrator 36 to preclude oscillations between the transmitter and receiver gain control loops. A bias input is also introduced into the integrator 81 to produce an output voltage which causes the transmitter amplifier 24 to drift to the higher gain condition. If there is sufficient received signal the receiver AGC 36 will provide a voltage to the transmitter AGC 81 which will balance the bias introduced. However, in the event of a low received signal the transmitter AGC 81 will drive the gain of transmitter amplifier 24 to a higher level until the received signal is sufficiently amplified so that the output from the receiver AGC 36 again balances the bias input to integrator 81. If amplifier 24 is driven to a maximum gain condition an output from voltage comparator 82 is produced. The output from comparator 82 represents an alarm condition due to low received energy with maximum transmitter gain and is connected to visual read-out display 83 to provide a warning of malfunction.

The alarm indication provided by the alarm circuit 25 may arise under several different malfunction conditions. For example if the conduit carrying the flowing medium 16 is not flowing fully enough to immerse transmitter and receiver 14 and 18 there may be insufficient received signal and the system will not track. No changes of state occur at the input to the pair of nor gates A13 in FIG. 8. This indicates the system is not tracking. If for some reason the signal at this point is constantly early or constantly late the one shot device A8 in FIG. 8 is not re-triggered, its pulse dwell time runs out, the digital state at the alarm indication output falls, causing the visual readout 83 to display a letter "A" in the left indicator, indicating malfunction, and the digital state connected to the voltage controlled oscillator gate 51 rises blocking VCO pulses 89 at that point.

Figure 4:
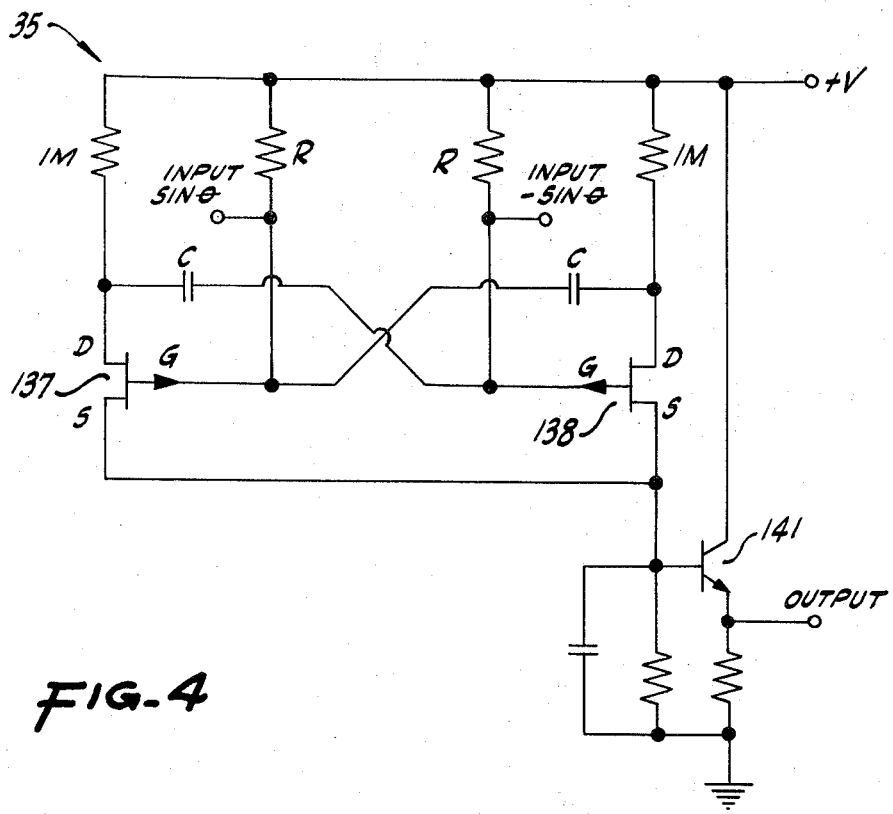
FIG. 4 is a schematic circuit showing one configuration of the low level full wave detector.

Turning now to FIG. 4 there is shown an alternate circuit for the low noise, low level detector 35. In this configuration the inverted push-pull output from amplifier 33 is applied to the gate of the first P channel junction FET 137. The gate is capacitor coupled to the drain of the second P channel junction FET 138. Since a positive pulse pinches off the P channel device, a positive pulse at the gate of the first junction FET 137 turns that device off while the same pulse connected to the drain of the second FET through the capacitor causes the second FET to conduct. The negative pulse from the non-inverting output of the push-pull amplifier simultaneously applied to the gate of the second P channel FET 138 enchances such conduction. The gate of the second junction FET 138 is also capacitor coupled to the drain of the first junction FET 137. Consequently the immediately following positive pulse at the gate of the second FET 138 turns that device off, brings the drain of the first FET 137 up and causes the first FET 137 to conduct in an enhanced manner. The full wave is thus rectified. The sources of both devices 137 and 138 are tied together and delivered to the base of an emitter follower 141. The emitter follower output is substantially that seen in the pulse 112 in FIG. 6a.

Fluid flow metering systems have been constructed in accordance with the foregoing description and operated to measure flow rates of fresh water, seat water and fuel oil in various size pipes. Several major sections of the system circuitry are depicted in FIGS. 8 through 11.

FIG. 8 shows the VCO control circuitry which establishes the VCO output frequency providing pulses to be counted. The first decision that the system is tracking and ready for counting is made in this circuit. The various circuit components had the following values:

Resistors

| | Ohms |
|---|---|
| R1 | 10K |
| R2 | 10K |
| R3 | 10K |
| R4 | 10K |
| R5 | 47K |
| R6 | 10K |
| R7 | 47K |
| R8 | 200 |
| R9 | 200 |
| R10 | 200 |
| R11 | 200 |
| R12 | 200 |
| R13 | 4.7K |
| R14 | 4.7K |
| R15 | 10K |
| R16 | 330K |

Capacitors

| | mf |
|---|---|
| C1 | 0.001 |
| C2 | 0.01 |
| C3 | 0.001 |
| C4 | 0.012 |
| C5 | 0.01 |
| C6 | 47 |
| C7 | 5 |

Solid State Devices

| | |
|---|---|
| A1 | 7402 |
| A2 | 7493 |
| A3 | 7493 |
| A4 | 7402 |
| A5 | 7474 |
| A6 | 74122 |
| A7 | 7402 |
| A8 | 74123 |
| A9 | 74123 |
| A10 | 74123 |
| A11 | HA2-2605-2 |
| A12 | HA2-2605-2 |
| A13 | 7402 |
| A14 | 7402 |
| A15 | 74123 |
| A16 | 74123 |
| A17 | 7474 |
| A18 | 74123 |
| A19 | 7402 |
| D1 | 1N459 |

FIG. 9 shows the circuit for receiving the pulse propagated through the flowing medium and processing the pulse as seen in FIGS. 6a and 6b to provide a well defined received pulse time of arrival for comparison with the delayed pulse. The various components in the circuit had the following values.

Resistors

| | ohms |
|---|---|
| R1 | 5.6K |
| R2 | 1K |
| R3 | 1K |
| R4 | 10K |
| R5 | 1K |
| R6 | 1K |

| | megohms |
|---|---|
| R7 | 1 |
| R8 | 1 |

| | ohms |
|---|---|
| R9 | 47K |
| R10 | 10K |
| R11 | 10K |
| R12 | 22K |
| R13 | 1K |
| R14 | 15K |
| R15 | 15K |
| R16 | 4.7K |
| R17 | 1K |
| R18 | 4.7K |
| R19 | 470 |
| R20 | 15K |
| R21 | 4.7K |
| R22 | 4.7K |
| R23 | 1K |
| R24 | 100K |

Capacitors

| | |
|---|---|
| C1 | 68 pf |
| C2 | 1 mf |
| C3 | 1 mf |
| C4 | 1 mf |
| C5 | 1 mf |
| C6 | 1 mf |
| C7 | 0.1 mf |
| C8 | 0.1 mf |
| C9 | 1 mf |
| C10 | 0.01 mf |
| C11 | 1 mf |
| C12 | 150 mf |
| C13 | 150 mf |
| C14 | 100 mf |

Solid State Devices

| | |
|---|---|
| A1 | MC1590G |
| A2 | MC 1590G |
| A3 | 72720N |
| A4 | 7474N |
| A5 | 72741P |
| A6 | HA2-2605-2 |
| A7 | HA2-2605-2 |
| A8 | 72720N |
| D1 | 1N750A |
| D2 | 1N750A |
| D3 | 1N754A |
| Q1 | 2N4360 |
| Q2 | 2N4360 |
| Q3 | 2N3704 |

Figure 10:
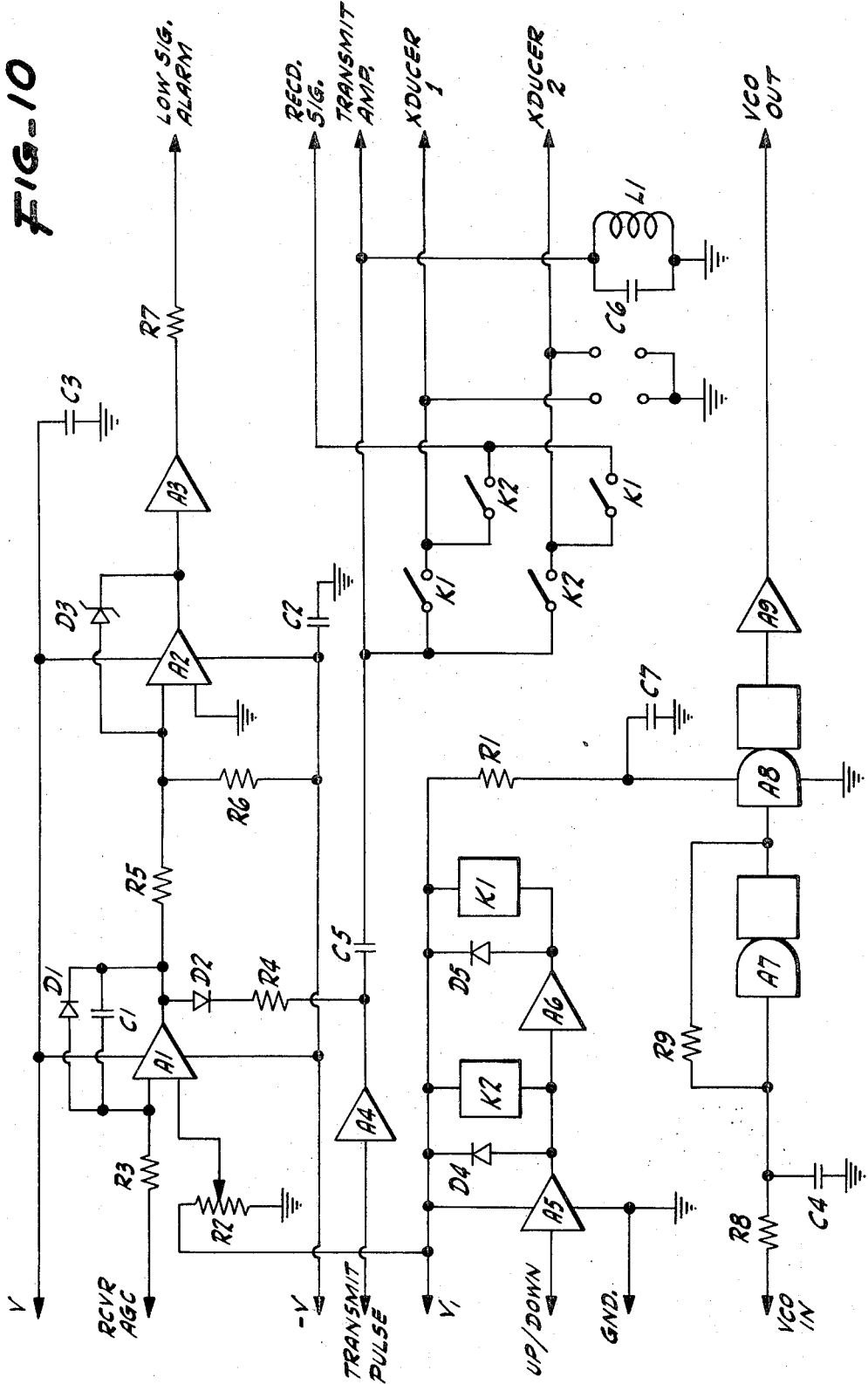
FIG. 10 is a schematic circuit showing the VCO and transmitted pulse direction control section of the system.

The transmitter, switching means and VCO circuit is shown in FIG. 10. This circuit contains the VCO, relay control response to up/down counter direction and the transmitter amplifier AGC. The various components in the circuit as constructed had the following values:

Resistors

| | ohms |
|---|---|
| R1 | 27 |
| R2 | 15K |
| R3 | 15K |
| R4 | 1K |
| R5 | 4.7K |
| R6 | 6.8K |
| R7 | 200 |
| R8 | 22K |
| R9 | 470 |

Capacitors

| | |
|---|---|
| C1 | 1 mf |
| C2 | 1 mf |
| C3 | 1 mf |
| C4 | 560 pf |
| C5 | 1 pf (Optional) |
| C6 (not used in 4 inch meter) | |
| C7 | 1 pf |

Inductances

L1 (Not used in 4 inch meter)

Solid State Devices

| | |
|---|---|
| A1 | 72741P |
| A2 | 72741P |
| A3 | 7406 |
| A4 | 7406 |
| A5 | 7406 |
| A6 | 7406 |
| A7 | 7413 |
| A8 | 7413 |
| A9 | 7406 |
| D1 | 1N459 |
| D2 | 1N457 |
| D3 | 1N750A |
| D4 | 1N457 |
| D5 | 1N457 |

Figure 11:
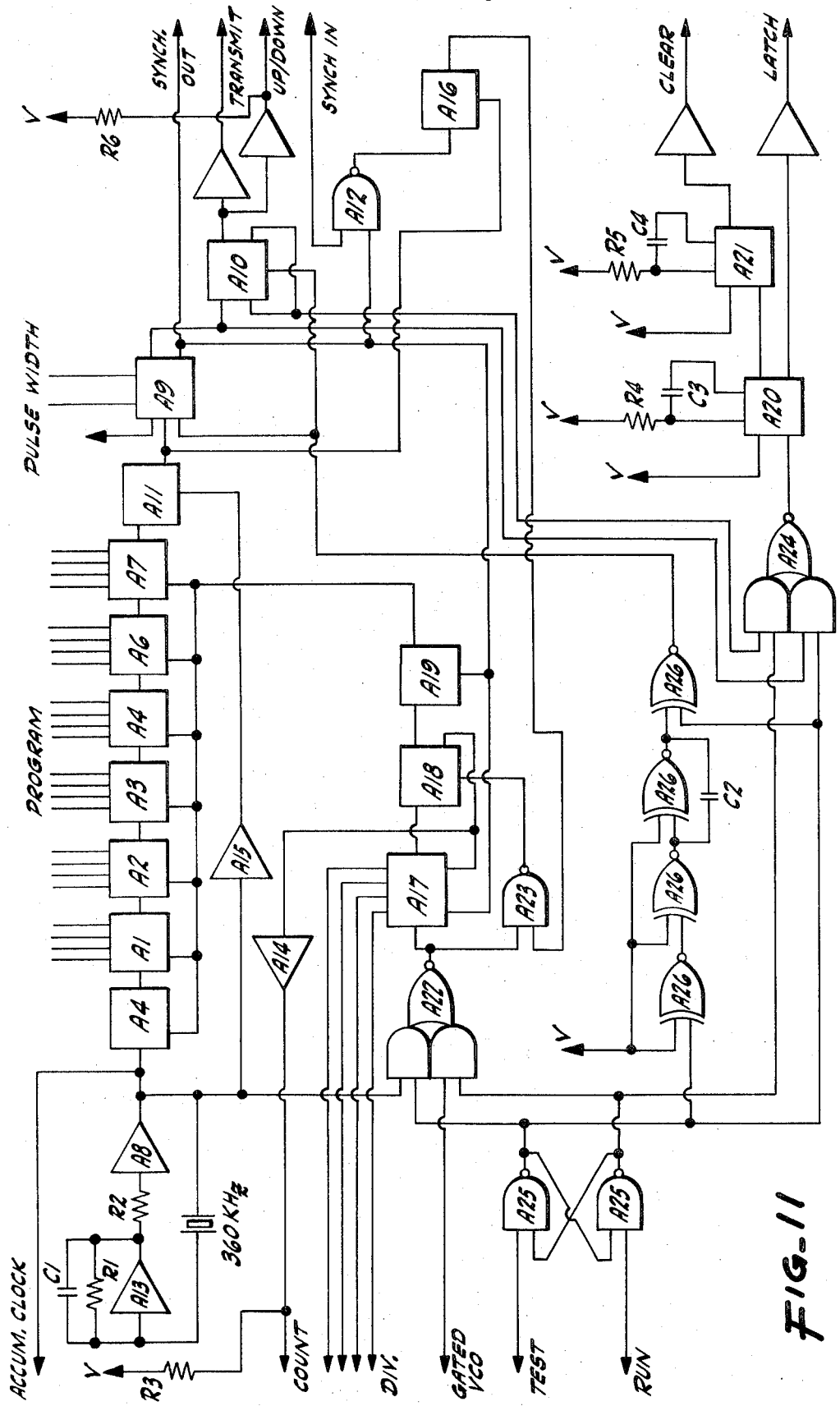
FIG. 11 is a schematic circuit showing the variable time base and up-down count control section of the system.

The variable time base calibration and up down count control features are shown in FIG. 11. This part of the system provides for calibration of VCO output in predetermined units of flow volume and controls the direction of energy propagation through the fluid. Final decision to count, and coordination between propagation direction and count direction is made here. The various components in the circuit as constructed had the following values:

Resistors

| | ohms |
|---|---|
| R1 | 1K |
| R2 | 1K |
| R3 | 200 |
| R4 | 10K |
| R5 | 10K |
| R6 | 200 |

Capacitors

| | |
|---|---|
| C1 | 27 pf |
| C2 | 0.001 mf |
| C3 | 220 pf |
| C4 | 220 pf |

Solid State Devices

| | |
|---|---|
| A1 | 74196 |
| A2 | 74196 |
| A3 | 74196 |
| A4 | 74196 |
| A5 | 74196 |
| A6 | 74196 |
| A7 | 74196 |
| A8 | 7404 |
| A9 | 74121 |
| A10 | 7474 |
| A11 | 74107 |
| A12 | 7400 |
| A13 | 7404 |
| A14 | 7406 |
| A15 | 7404 |
| A16 | 7474 |
| A17 | 74196 |
| A18 | 74107 |
| A19 | 7474 |
| A20 | 74123 |
| A21 | 74123 |
| A22 | 7450 |
| A23 | 7400 |
| A24 | 7450 |
| A25 | 7400 |
| A26 | 7486 |

Crystal

360KHz cc

The system constructed in accordance with the foregoing provided measurement of average velocity with accuracy better than 0.25 percent of full scale. Unknown velocity profile changes effect the accuracy of calibrated volumetric flow rate. A characteristic of primary importance is the fluid velocity resolution of 0.008 feet/second. These system capabilities were demonstrated under widely varying conditions including 4 inch diameter pipe flow of fresh water, 8 foot diameter pipe flow of sea water and 12 inch diameter pipe flow of fuel oil.

Thus it is seen that the invention described herein provides an accurate calibrated fluid flow metering system and method which provides ample warning for improper metering indication due to system component malfunction or insufficient flow to adequately fill the conduit or channel. Positive indication of system tracking is provided as is a positive indication of the fluid flow direction.

I claim:

1. In a fluid flow metering system of the type including first and second transducers spaced in relative upstream-downstream positions in communication with the fluid to be metered, means for applying signals for alternate periods to said first and second transducers for transmission through the fluid, means for receiving transmitted signals sensed by the second and first transducers respectively during the alternate periods, a voltage controlled oscillator, means responsive to the transit time of said transmitted signals serving to generate a control voltage for controlling the frequency of said oscillator, and means for determining the difference in number of oscillator output cycles during upstream and downstream transmission periods and providing an output signal indicative of flow.

2. A fluid flow metering system as in claim 1 wherein said means for controlling the frequency of said oscillator comprises means for generating a reference signal after a predetermined number of output cycles from said oscillator following the transmission of a signal, and means for time comparing said transmitted and reference signals and using the result of the comparison to generate said control voltage to vary the frequency of said oscillator until said reference and transmitted signals are in time coincidence.

3. A system as in claim 2 wherein the means for generating a reference signal comprises a pulse divider, circuit means enabling said divider with a VCO pulse, first pulse generating means activated by output from said divider after a predetermined number of VCO pulses and producing a first pulse having a predetermined dwell time, and second pulse generating means activated by the end of the first pulse, whereby said second pulse is the reference signal delayed for the predetermined number of VCO output periods plus the dwell time of the first pulse.

4. A fluid flow metering system as in claim 2 wherein the means for time comparing said transmitted and reference signals comprises first circuit means responsive to the time of arrival of the transmitted signal, second circuit means generating a constant charge pulse, third circuit means to produce one polarity of constant charge for an early transmitted signal and the opposite polarity for a late transmitted signal, and integrating means connected to the VCO input to receive the constant charge pulses of varying polarity, whereby the VCO output frequency will rise as a result of an early transmitted signal and fall as a result of a late transmitted signal.

5. A fluid flow metering system as in claim 4 together with fail-safe alarm indication comprised of retriggerable circuit means responsive to change from early to late or late to early transmitted signal and having an output with a predetermined dwell time, whereby the output is maintained as long as a change occurs within the dwell time.

6. A fluid flow metering system as in claim 1 wherein said means for determining the difference in number of oscillator output cycles for upstream and downstream periods comprises a variable time base circuit providing a defined period of upstream and downstream counting, circuit means to disable said variable time base between periods, a decade register, a binary register, circuit means connected to said variable time base and said registers to disable said time base and change the transmit-receive modes of the transducers between periods and direct alternate up and down counting of cycles during alternate counting periods, whereby the difference in counted cycles is displayed as a calibrated indication of flow.

7. A fluid flow metering system as in claim 6 wherein said variable time base circuit comprises a crystal oscillator providing a clock frequency, a counting register providing an output when filled, having the clock frequency connected to the input, and a program to load said register with a predetermined initial count, whereby a predetermined period of time from beginning of count to output from the register when filled is obtained.

8. A fluid flow metering system as in claim 1 wherein said means for receiving transmitted signals sensed by the transducers comprises circuit means providing a push-pull form of said received transmitted signal, a low level detector connected to the push-pull output, circuit means providing automatic gain control to maintain the push-pull output at a desired level of amplitude, a differentiator set to operate at maximum slew rate with the detector signal input, a received pulse voltage comparator providing output with a time delay from the first sound point with the differentiator signal input, a pulse-shaper circuit, and circuit means responsive to the comparator output presenting a signal to said pulse-shaper, and circuit means connecting the shaped pulse to said means for controlling the VCO frequency.

9. A fluid flow metering system as in claim 8 wherein said circuit means responsive to the comparator output comprises a cross-over comparator in parallel with said detector and receiving the sensed transmitted signals, a gate enabled by said received pulse comparator and triggered by the cross-over comparator, whereby the pulse-shaper is fired by the gate output.

10. A fluid flow metering system as in claim 8 wherein said circuit means responsive to the comparator output comprises a switch connecting said received pulse comparator to said pulse-shaper, whereby error induced by excessive phase noise in the transmitted pulse is eliminated.

11. Apparatus as in claim 8 wherein the low level detector comprises first and second junction FET's, a capacitor coupling between the gate of the first FET and the drain of the second FET, a capacitor coupling between the gate of the second FET and the drain of the first FET, a positive voltage supply, first and second resistances between the positive voltage and the drains, an inverted signal applied to the gate of the first FET, a non-inverted signal applied to the gate of the second FET, an emitter follower, a common connection between the sources of the first and second FET's and the base of the emitter follower, whereby all the pulses from the inverted and the non-inverted signals of one polarity appear at the emitter follower output.

12. Apparatus as in claim 8 wherein the low level detector comprises a first junction FET and a second junction FET, a common connection between the gates of the first and second junction FET's, an inverted signal capacitor coupled to the drain of the first junction FET, a non-inverted signal capacitor coupled to the drain of the second FET, a potential placed on the gates at the signal ground, an emitter follower, a negative voltage supply, a resistance between the negative voltage and the emitter, a common connection between the sources of the first and second junction FET's and the base of the emitter follower, whereby all the pulses from the inverted and non-inverted signals of one polarity appear at the emitter follower output.

13. A fluid flow metering system as in claim 8 wherein the means for applying signals for alternate periods to said first and second transducers comprises circuit means generating a transmit pulse actuated by a VCO pulse, a transmit pulse amplifier, circuit means providing automatic gain control for said transmit amplifier responsive to the signal from said push-pull amplifier automatic gain control, and an alarm comparator responsive to said transmit amplifier output, whereby the transmit amplifier gain is held high enough to provide adequate received signal and alarm indication when the amplifier gain is at maximum.

14. A fluid flow metering system for measuring fluid flow, comprising first and second transducers spaced generally in relative upstream-downstream positions in communication with the fluid, a voltage controlled oscillator to provide a continuous series of output pulses, a divider adjusted to receive said oscillator pulses and provide a delayed output pulse after a predetermined number of pulses are received from the oscillator, a transmit pulse generator, a control circuit connected to simultaneously initiate the divider and transmit pulse generator, circuit means to connect the transmit pulse to the first transducer during the period transmission is upstream and to the second transducer during the period transmission is downstream, a received signal processing circuit, circuit means to conduct the received pulse to the received signal processing circuit from the second transducer during the period transmission is upstream and from the first transducer during the period transmission is downstream, a time of arrival circuit connected to receive the received signal and delayed pulse and provide an output signal which is a function of the time of arrival of the pulses, means connecting the time of arrival output to the VCO to alter the VCO output frequency and cause the delayed pulse to assume time coincidence with the received pulse, and a data count circuit to determine the difference between the VCO output pulses for predetermined periods of time within the period of transmission upstream and downstream.

15. In a fluid flow measuring system of the type including first and second transducers spaced in the direction of fluid flow in communication with the fluid to be metered, means for applying input signals alternately to said first and second transducers for a predetermined period of time to transmit signals through said fluid alternately in an upstream and downstream direction from one transducer towards the other to develop output signals in said other transducer, means responsive to the time between said input and output signals for generating control voltages representative of an upstream and downstream transit time of said signals, a voltage controlled oscillator connected to receive said control signals and oscillating at first and second frequencies representative of the upstream and downstream transit times, and means for measuring the difference in oscillation frequency for upstream and downstream transmission to provide an output indicative of flow.

16. The method of measuring fluid flow which comprises transmitting signals through the fluid for alternate periods upstream and downstream of the flow, initiating a reference signal at the same time as the transmitted signal, delaying the reference signal for a predetermined period of time, receiving the transmitted signal, comparing the times of the received and delayed signals, generating a control signal determined by the time comparison, varying the frequency of a single voltage controlled oscillator responsive to the control signal for upstream and downstream received signals during said alternate periods, accumulating a number of oscillator cycles for a predetermined time during the downstream transmission period, subtracting a number of oscillator cycles for the predetermined time during the upstream transmission period, and scaling the remaining number of oscillator cycles to provide an indication of fluid flow.

17. A method for measurement of fluid flow utilizing at least one pair of first and second ultrasonic energy transducers capable of functioning as transmitters and receivers in communication with the fluid which comprises generating an energy pulse at the otput of a voltage controlled oscillator, transmitting the energy pulse through the medium for which the flow is to be measured first in a generally upstream direction and then in a generally downstream direction, providing a delayed pulse responsive to the energy pulse and to a predetermined number of cycles of said oscillator, receiving the energy pulse which has been transmitted through the medium, processing the received pulse to provide a pulse representing the received pulse time of arrival, comparing the processed-received pulse time of arrival with the time of arrival of the delayed pulse, generating a control voltage from the comparison, applying the control voltage to the voltage controlled oscillator driving the oscillator output to a higher frequency for an early processed-received pulse and to a lower frequency for a late processed-received pulse, counting the number of cycles produced by said oscillator when the processed-received pulse and the delayed pulse substantially coincide in time for both upstream and downstream transmissions, obtaining a difference between the upstream count and the downstream count, and calibrating the count by predetermining the amount of time the count should be accumulated both upstream and downstream so that the difference will directly represent desired units of flow measurement.

* * * * *